(12) United States Patent
Chien et al.

(10) Patent No.: US 11,258,332 B2
(45) Date of Patent: Feb. 22, 2022

(54) MOTOR BASE AND MOTOR STRUCTURE

(71) Applicant: Delta Electronics, Inc., Taoyuan (TW)

(72) Inventors: Han-En Chien, Taoyuan (TW);
Hung-Chi Chen, Taoyuan (TW);
Meng-Yu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 226 days.

(21) Appl. No.: 16/739,290

(22) Filed: Jan. 10, 2020

(65) Prior Publication Data
US 2020/0227973 A1    Jul. 16, 2020

Related U.S. Application Data

(63) Continuation-in-part of application No. 16/368,557, filed on Mar. 28, 2019.

(30) Foreign Application Priority Data

Jan. 11, 2019 (CN) .......................... 201910026567.9

(51) Int. Cl.
*H02K 5/24* (2006.01)
*H02K 15/14* (2006.01)
(Continued)

(52) U.S. Cl.
CPC .............. *H02K 5/24* (2013.01); *H02K 5/225* (2013.01); *H02K 15/14* (2013.01); *H02K 7/14* (2013.01)

(58) Field of Classification Search
CPC .. H02K 5/24; H02K 5/02; H02K 5/04; H02K 5/15; H02K 21/22; H02K 7/14; H02K 11/33; H02K 1/187
(Continued)

(56) References Cited

U.S. PATENT DOCUMENTS 6,208,052 B1    3/2001  Kershaw et al.
7,361,844 B2    4/2008  Vinciarelli et al.
(Continued)

FOREIGN PATENT DOCUMENTS

CN    102324799 A    1/2012
CN    103527525 A    1/2014
(Continued)

OTHER PUBLICATIONS

JP-H0591923-U (English Translation) (Year: 1993).*

*Primary Examiner* — Quyen P Leung
*Assistant Examiner* — Alexander Moraza
(74) *Attorney, Agent, or Firm* — Kirton McConkie; Evan R. Witt

(57) ABSTRACT

The present disclosure provides a motor structure including a winding set, a rotor and a motor base. The rotor is driven by the winding set. The motor base includes a central portion, a surrounding portion, at least one connecting element and at least one limitation element. The winding set is disposed on the central portion. The surrounding portion is disposed around the central portion. The limitation element includes a first limitation part and a second limitation part disposed on the central portion and the surrounding portion, respectively. The connecting element is deformable and connected between the central portion and the surrounding portion. The connecting element includes a first supporting part and a second supporting part connected between a deformation part. The first supporting part, the second supporting part and the deformation part are cooperatively form a buffer zone between the first limitation part and the second limitation part.

20 Claims, 12 Drawing Sheets

(51) Int. Cl.
*H02K 7/14* (2006.01)
*H02K 5/22* (2006.01)

(58) Field of Classification Search
USPC ........ 310/51, 89, 91; 415/119; 416/190, 500
See application file for complete search history.

(56) References Cited

U.S. PATENT DOCUMENTS

| | | | |
|---|---|---|---|
| 7,762,700 | B2 | 7/2010 | Luo et al. |
| 7,799,615 | B2 | 9/2010 | Vinciarelli et al. |
| 7,845,824 | B2 | 12/2010 | Robotham |
| 9,013,074 | B2 | 4/2015 | Figgins et al. |
| 10,298,848 | B2 | 5/2019 | Zhang et al. |
| 2003/0098660 | A1 | 5/2003 | Erdman et al. |
| 2006/0250039 | A1 | 11/2006 | Yamamoto |
| 2007/0176502 | A1 | 8/2007 | Kasai et al. |
| 2012/0068581 | A1* | 3/2012 | Chien .................. H02K 1/2786 310/68 B |
| 2014/0021810 | A1 | 1/2014 | Figgins et al. |
| 2016/0099623 | A1 | 4/2016 | Bohm et al. |
| 2016/0316570 | A1 | 10/2016 | De Vaan et al. |
| 2016/0320812 | A1 | 11/2016 | Su |
| 2019/0300047 | A1 | 10/2019 | Hamada |

FOREIGN PATENT DOCUMENTS

| | | |
|---|---|---|
| CN | 103527525 B | 2/2016 |
| CN | 105490494 A | 4/2016 |
| CN | 207819735 U | 9/2018 |
| CN | 108633216 A | 10/2018 |
| CN | 208508648 U | 2/2019 |
| JP | H0591923 U * | 12/1993 |
| JP | 2001197702 A | 7/2001 |
| JP | 2012100516 A | 5/2012 |
| JP | 2012146382 A | 8/2012 |
| JP | 2015146731 A | 8/2015 |
| TW | 183658 U | 4/2002 |
| TW | I525966 B | 3/2016 |
| TW | I556553 B | 11/2016 |

* cited by examiner

MOTOR BASE AND MOTOR STRUCTURE

CROSS-REFERENCE TO RELATED APPLICATION

This application is a continuation-in-part application of U.S. application Ser. No. 16/368,557 filed on Mar. 28, 2019 and entitled "MOTOR BASE AND MOTOR STRUCTURE", which claims priority to China Patent Application No. 201910026567.9 filed on Jan. 11, 2019. This application also claims priority to China Patent Application No. 201910026567.9 filed on Jan. 11, 2019. The entire contents of the above-mentioned patent applications are incorporated herein by reference for all purposes.

FIELD OF THE INVENTION

The present disclosure relates to a motor base and a motor structure, and more particularly to a motor base and a motor structure having an integrally formed vibration eliminating structure.

BACKGROUND OF THE INVENTION

During the operation of the motor, vibration is unavoidably generated from the main components such as stator and rotor, which result in collision and noise. Generally, the main components of the motor are disposed on the motor base. The conventional motor base has a structure including vibration eliminating material such as rubber and silicon. However, the vibration eliminating material is generally disposed around periphery of the motor base, so that the vibration generated during the operation of the motor is still transferred within the structure of the motor base. Consequently, the vibration adversely affects the other components disposed on the motor base, which means the vibration eliminating effect is unsatisfied. Furthermore, the vibration eliminating material is assembled with the motor base after the manufacture process of the motor base has been finished, which is requiring additional time and effort.

Therefore, there is a need of providing a motor base and a motor structure having an integrally formed vibration eliminating structure to obviate the drawbacks of insufficient vibration eliminating effect encountered from the prior arts and simplify the manufacture process of the motor base and the motor structure.

SUMMARY OF THE INVENTION

It is an object of the present disclosure to provide a motor base and a motor structure having an integrally formed vibration eliminating structure. By utilizing a deformable connecting element connected between the central portion and the surrounding portion of the motor base to provide multidimensional buffer function, the effects of eliminating vibration and noise of the motor base and the motor structure are enhanced.

It is another object of the present disclosure to provide a motor base and a motor structure having an integrally formed vibration eliminating structure. By utilizing the technique such as over molding or insert molding, the buffer component is integrally disposed in and covering the motor base, so as to simplify the assembly process. It also benefits to enhance the effects of eliminating vibration and noise and achieve the effects of waterproofing, dustproof and protection.

It is a further object of the present disclosure to provide a motor base and a motor structure having an integrally formed vibration eliminating structure. By utilizing at least one limitation element, the deformable connecting element connected between the central portion and the surrounding portion of the motor base is limited to vibrate at a specific range, so that a violent vibration is avoided, and the effects of eliminating vibration and noise of the motor base and the motor structure are further enhanced.

In accordance with an aspect of the present disclosure, there is provided a motor structure. The motor structure includes a winding set, a rotor and a motor base. The rotor is corresponding to and driven by the winding set. The motor base includes a central portion, a surrounding portion and at least one connecting element. The central portion is configured to dispose the winding set thereon. The surrounding portion is disposed around the central portion. The connecting element is deformable and connected between the central portion and the surrounding portion. The connecting element includes a first supporting part, a second supporting part and a deformation part. The first supporting part is connected with the central portion, and the hardness of the first supporting part is greater than or equal to that of the central portion. The second supporting part is connected with the surrounding portion, and the hardness of the second supporting part is greater than or equal to that of the surrounding portion. The deformation part is connected between the first supporting part and the second supporting part.

In accordance with another aspect of the present disclosure, there is provided a motor base. The motor base is disposed in a motor structure including a winding set and includes a central portion, a surrounding portion and at least one connecting element. The central portion is configured to dispose the winding set thereon. The surrounding portion is disposed around the central portion. The connecting element is deformable and connected between the central portion and the surrounding portion. The connecting element includes a first supporting part, a second supporting part and a deformation part. The first supporting part is connected with the central portion, and the hardness of the first supporting part is greater than or equal to that of the central portion. The second supporting part is connected with the surrounding portion, and the hardness of the second supporting part is greater than or equal to that of the surrounding portion. The deformation part is connected between the first supporting part and the second supporting part.

In accordance with a further aspect of the present disclosure, there is provided a motor structure. The motor structure includes a winding set, a rotor and a motor base. The rotor is corresponding to and driven by the winding set. The motor base includes a central portion, a surrounding portion, at least one connecting element and at least one limitation element. The central portion is configured to dispose the winding set thereon. The surrounding portion is disposed around the central portion. The at least one connecting element is deformable and connected between the central portion and the surrounding portion. The at least one connecting element includes a first supporting part, a second supporting part and a deformation part. The first supporting part is connected with the central portion. The hardness of the first supporting part is greater than or equal to that of the central portion. The second supporting part is connected with the surrounding portion. The hardness of the second supporting part is greater than or equal to that of the surrounding portion. The deformation part is connected between the first supporting part and the second supporting part. The at least one limitation element spatially corresponds to the at last one connecting element and is disposed adjacent to the at least one connecting element. The at least one limitation element includes a first limitation part and a second limitation part. The first limitation part is disposed on the central portion and spaced apart from the first supporting part. The second limitation part is disposed on the surrounding portion and spaced apart from the second supporting part.

In accordance with an additional aspect of the present disclosure, there is provided a motor base. The motor base is disposed in a motor structure including a winding set and includes a central portion, a surrounding portion, at least one connecting element and at least one limitation element. The central portion is configured to dispose the winding set thereon. The surrounding portion is disposed around the central portion. The at least one connecting element is deformable and connected between the central portion and the surrounding portion. The at least one connecting element includes a first supporting part, a second supporting part and a deformation part. The first supporting part is connected with the central portion. The hardness of the first supporting part is greater than or equal to that of the central portion. The second supporting part is connected with the surrounding portion. The hardness of the second supporting part is greater than or equal to that of the surrounding portion. The deformation part is connected between the first supporting part and the second supporting part. The at least one limitation element spatially corresponds to the at last one connecting element and is disposed adjacent to the at least one connecting element. The at least one limitation element includes a first limitation part and a second limitation part. The first limitation part is disposed on the central portion and spaced apart from the first supporting part. The second limitation part is disposed on the surrounding portion and spaced apart from the second supporting part.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
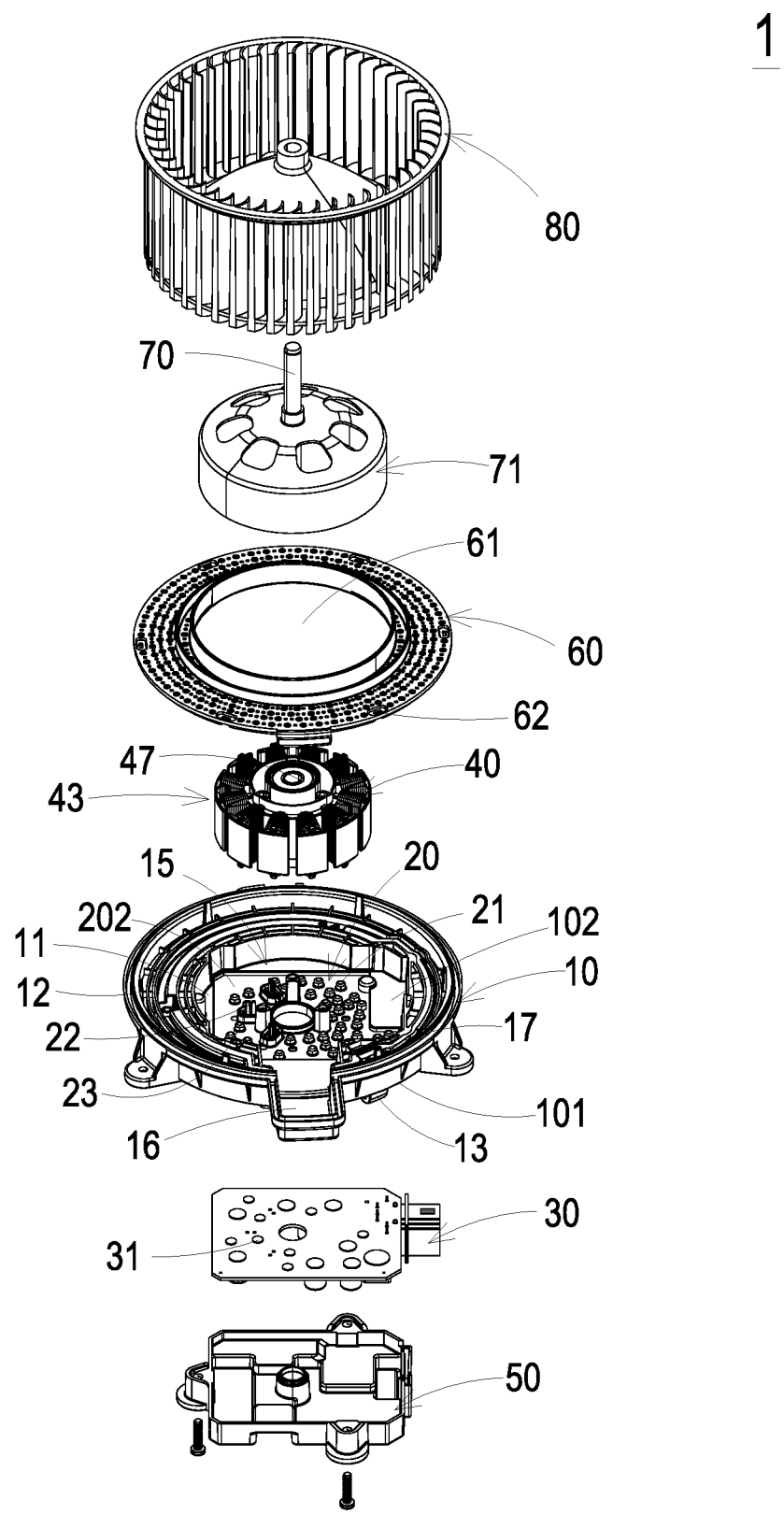
FIG. 1 is an explored view illustrating a motor structure according to a first embodiment of the present disclosure.
Figure 2:
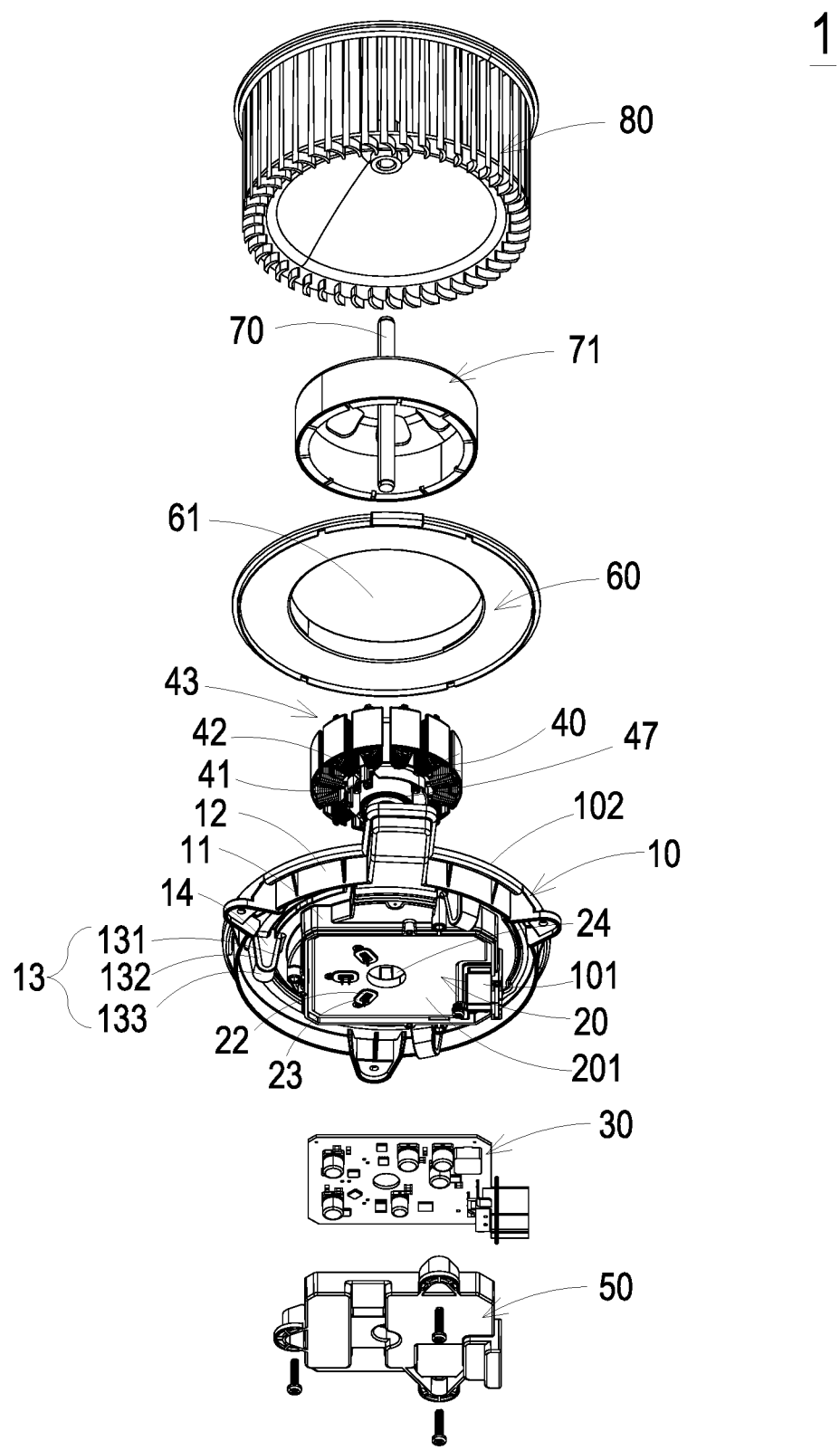
FIG. 2 is another explored view illustrating the motor structure according to the first embodiment of the present disclosure and taken at a different observation angle.
Figure 3:
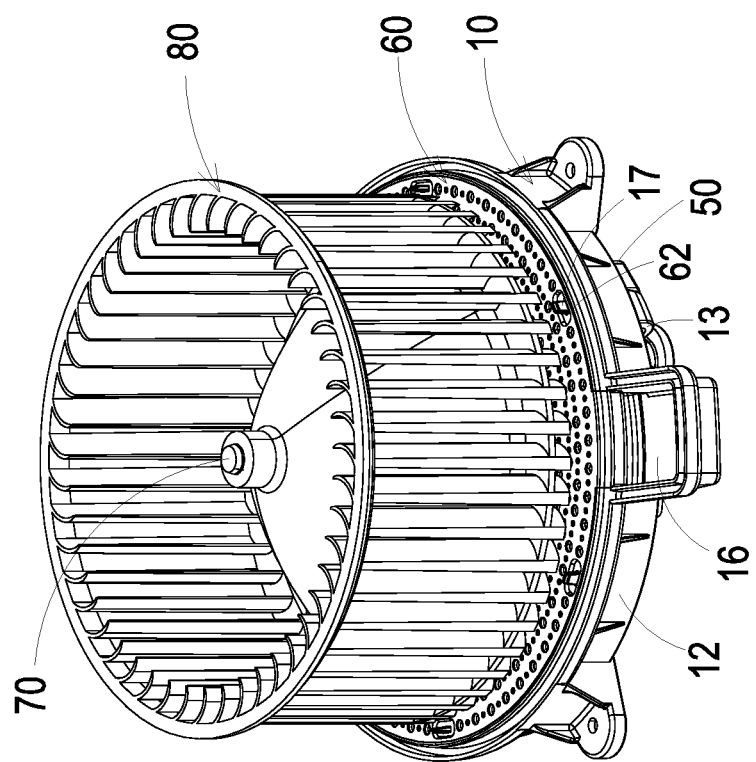
FIG. 3 is a schematic perspective view illustrating the motor structure according to the first embodiment of the present disclosure.
Figure 4:
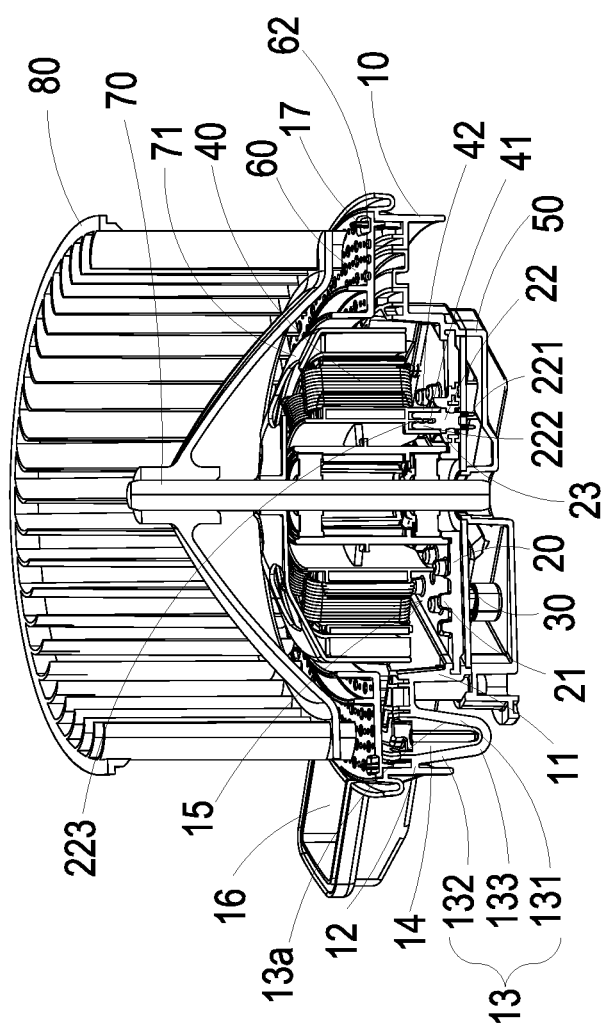
FIG. 4 is a cross sectional view illustrating the motor structure according to the first embodiment of the present disclosure.
Figure 5:
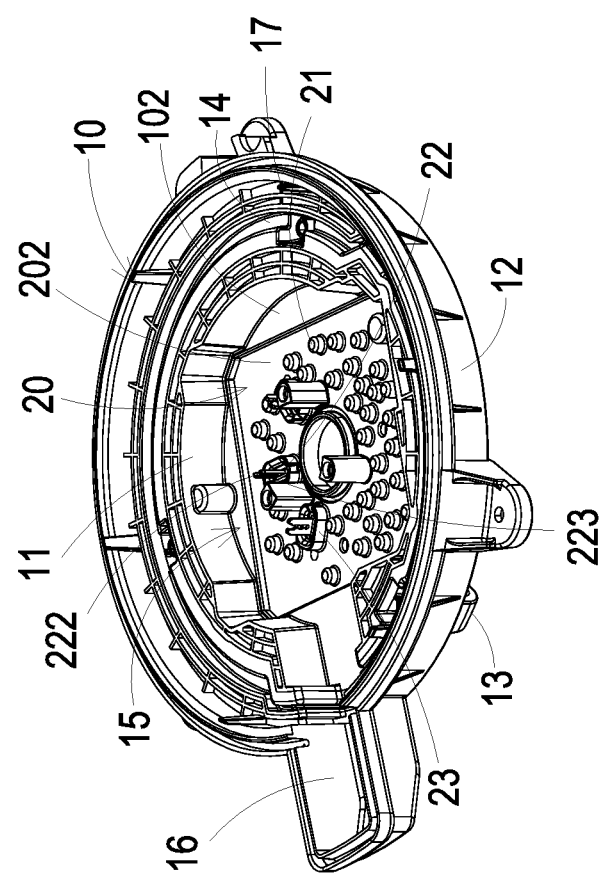
FIG. 5 is a schematic perspective view illustrating the motor base according to the first embodiment of the present disclosure.
Figure 6:
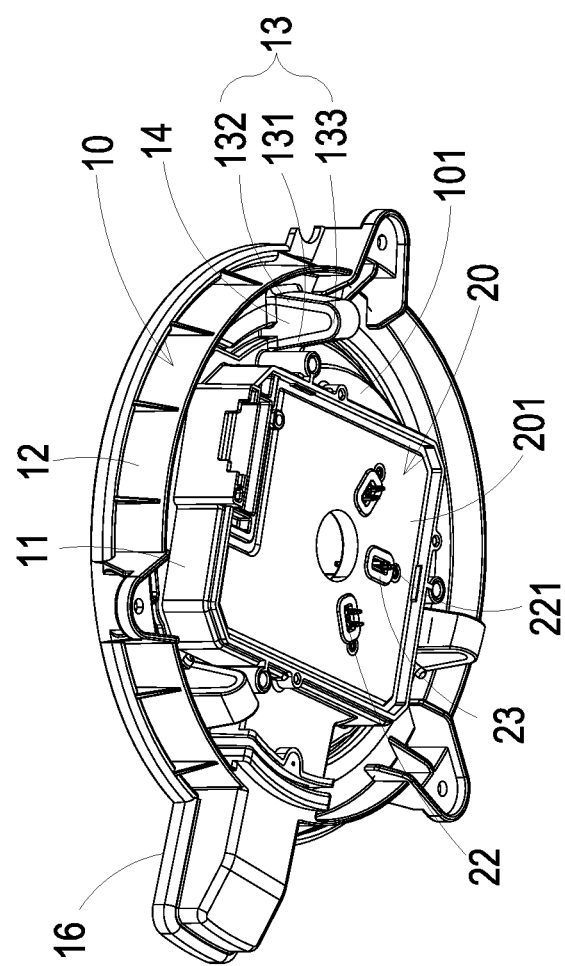
FIG. 6 is another schematic perspective view illustrating the motor base according to the first embodiment of the present disclosure and taken at a different observation angle.

FIGS. 1 and 2 are explored views illustrating a motor structure according to a first embodiment of the present disclosure. FIG. 3 is a schematic perspective view illustrating the motor structure according to the first embodiment of the present disclosure. FIG. 4 is a cross sectional view illustrating the motor structure according to the first embodiment of the present disclosure. FIGS. 5 and 6 are schematic perspective views illustrating the motor base according to the first embodiment of the present disclosure. In the embodiment, the motor structure 1 includes a motor base 10, a heat dissipation module 20, a circuit board 30, a winding set 40, a first cover 50, a second cover 60, a rotor 71 and a fan blade assembly 80. The motor base 10 includes a central portion 11, a surrounding portion 12, at least one connecting element 13 and a buffer component 14. The heat dissipation module 20 includes a first side 201, a second side 202 and at least one heat dissipation element 21. The first side 201 and the second side 202 are opposite to each other. Preferably but not exclusively, the heat dissipation element 21 is a fin or a bump, which is convexly disposed on the second side 202. The motor base 10 is connected to the heat dissipation module 20 for example through the central portion 11, and uncovers the first side 201 and the second side 202 of the heat dissipation module 20. In the embodiment, the thermal conductivity of the heat dissipation module 20 is greater than the thermal conductivity of the motor base 10. Moreover, in the embodiment, the heat dissipation module 20 and the motor base 10 are further combined with each other by over molding or insert molding so as to integrally form a one-piece structure. The circuit board 30 is disposed on the first side 201 of the heat dissipation module 20. The rotor 71 has a rotating shaft 70 and disposed on the second side 202 of the heat dissipation module 20. The winding set 40 is disposed on the second side 202 of the heat dissipation module 20. The winding set 40 is electrically connected to the circuit board 30. The winding set 40 is configured to drive the rotor 71 to rotate. The rotor 71 rotates through the rotating shaft 70 as an axis. Thus, the motor base 10 and the heat dissipation module 20, which are integrally formed into one piece, are attached to the circuit board 30 through the first side 201 of the heat dissipation module 20. Consequently, the heat generated from the heat-generating components (not shown), which are electronic components disposed on the circuit board 30, can be dissipated effectively. In addition, the motor base 10 and the heat dissipation module 20 are integrally formed into one piece to improve the supporting strength through the second side 202 of the heat dissipation module 20, thereby carrying the winding set 40 firmly.

On the other hand, in the embodiment, the surrounding portion 12 of the motor base 10 is disposed around the central portion 11, and the at least one connecting element 13 is deformable and connected between the central portion 11 and the surrounding portion 12. In the embodiment, the surrounding portion 12 is connected to the central portion 11 through three connecting elements 13 equally spaced apart with each other, but the present disclosure is not limited thereto. In the embodiment, the connecting element 13 further includes a first supporting part 131, a second supporting part 132 and a deformation part 133. In the embodiment, the first supporting part 131 is connected with the central portion 11, and the hardness of the first supporting part 131 is great than or equal to the hardness of the central portion 11. The second supporting part 132 is connected with the surrounding portion 12, and the hardness of the second supporting part 132 is greater than or equal to the hardness of the surrounding portion 12. In addition, the deformation part 133 is connected between the first supporting part 131 and the second supporting part 132, so that the connecting element 13 is deformable and connected between the central portion 11 and the surrounding portion 12. In the embodiment, the central portion 11, the surrounding portion 12 and the at least one connecting element 13 of the motor base 10 are integrally formed into one piece for example by over molding or insert molding, but the present disclosure is not limited thereto. It is noted that the circuit board 30 and the winding set 40 of the motor structure 1 are disposed on the first side 201 and the second side 202 of the heat dissipation module 20, respectively, and the heat dissipation module 20 is further connected to the central portion 11 of the motor base 10. Namely, the circuit board 30 having for example the heat generating components (not shown) to generate the heat and the winding set 40 having for example the main components to generate the vibration are all disposed on the central portion 11 of the motor base 10, and the central portion 11 is connected to the surrounding portion 12 through the at least one connecting element 13. By utilizing the connecting element 13 deformable and connected between the central portion 11 and the surrounding portion 12 to provide a buffer function, the supporting strength of the motor base 10 is improved. It further achieves the functions of eliminating the vibration and the noise.

In the embodiment, the motor base 10 includes for example but not limited to three connecting elements 13, which are annularly distributed and corresponding to each other or equally spaced apart with each other. The first supporting part 131, the second supporting part 132 and the deformation part 133 of the connecting element 13 are configured to form a U-shaped, W-shaped or V shaped structure having at least one bending bridge disposed between the central portion 11 and the surrounding portion 12, so as to cooperatively form a deformable buffer zone 13a (see FIG. 4). Consequently, a multidimensional deformation space is provided for allowing the deformation part 133 to deform, and the central portion 11 is able to occur certain degree of movement or rotation corresponding to the surrounding portion 12. In the embodiment, the first supporting part 131, the second supporting part 132 and the deformation part 133 of the connecting element 13 are made of the same material, for example plastic, but not limited thereto. The first supporting part 131, the second supporting part 132 and the deformation part 133 of the connecting element 13 could be made of different materials. Certainly, the size, the shape, the number, the position and the interval of the connecting elements 13 formed by the first supporting part 131, the second supporting part 132 and the deformation part 133 are adjustable according to the practical requirements, and the present disclosure is not limited thereto. It should be emphasized that the main components of the motor structure 1, such as the winding set 40, are disposed on the central portion 11 of the motor base 10, and the central portion 11 is connected to the surrounding portion 12 through the connecting elements 13. With the deformation of the connecting elements 13 disposed between the central portion 11 and the surrounding portion 12, a multidimensional buffer function is provided to avoid the vibration generated during the operation of the main components of the motor structure 1 being transported to the surrounding portion 12, and improve the supporting strength of the motor base 10 and the effects of eliminating the vibration and the noise.

Moreover, in the embodiment, the motor base 10 further includes a buffer component 14. The buffer component 14 is for example made of rubber, silicon or foaming material, and is disposed between the central portion 11 and the surrounding portion 12. Preferably but not exclusively, the buffer component 14 is filled within the buffer zone 13a cooperatively formed by the first supporting part 131, the second supporting part 132 and the deformation part 133. In some embodiments, the buffer component 14 is merely disposed between the central portion 11 and the surrounding portion 12, which means the buffer component 14 isn't filled within the buffer zone 13a. In the embodiment, the central portion 11, the surrounding portion 12 and the at least one connecting element 13 of the motor base 10 and the buffer component 14 are integrally formed into one piece by over molding or insert molding. The central portion 11, the surrounding portion 12 and the at least one connecting element 13 are made of the same material, for example but not limited to be made of plastic, and the buffer component 14 is made of rubber, but the present disclosure is not limited thereto. In some embodiments, the buffer component 14 is filled or removed from a second surface 102 of the motor base 10 so as to be replaced as the elastic property thereof is weaken. By the buffer component 14, the effects of eliminating the vibration and the noise and the effect of waterproofing of the motor base 10 are further improved.

In the embodiment, the motor structure 1 further includes at least one conductive terminal 22 and at least one gasket element 23. The conductive terminal 22 runs through the first side 201 and the second side 202 of the heat dissipation module 20 located on the central portion 11, so as to connect to the circuit board 30 disposed on the first side 201 of the heat dissipation module 20 and the winding set 40 disposed on the second side 202 of the heat dissipation module 20. Certainly, the electrical connection between the circuit board 30 and the winding set 40 is not limited thereto. In addition, the gasket element 23 for example runs through the first side 201 and the second side 202 of the heat dissipation module 20 located on the central portion 11, is disposed between the heat dissipation module 20 and the conductive terminal 22, so that the conductive terminal 22 is fixed on the heat dissipation module 20 through the gasket element 23. In the embodiment, the motor base 10, the heat dissipation module 20, the conductive terminal 22 and the gasket element 23 are integrally formed into one piece for example by over molding or insert molding, so as to simplify the assembly process and eliminate the use of redundant components at the same time. It also benefits to achieve the effects of waterproofing, dustproof and protection. In the embodiment, the conductive terminal 22 includes a first end portion 221 and a second end portion 222. The first end portion 221 is exposed from the first side 201 and electrically connected to the circuit board 30. The second end portion 222 is exposed from the second side 202 and electrically connected to the winding set 40. In the embodiment, the second end portion 222 further includes a fastening element 223, for example having two arms opposite to each other. The two arms are configured to form two jagged blades in staggered arrangement. The winding set 40 includes at least one copper wire 41 and an engagement component 42. The engagement component 42 is configured to engage with the at least one conductive terminal 22. Preferably but not exclusively, the copper wire 41 of the winding set 40 is an end of wire clamped between the two arms of the fastening element 223, so that the copper wire 41 is electrically connected with the conductive terminal 22. Preferably but not exclusively, the engagement component 42 is an engagement slot spatiality corresponding to the two arms of the fastening element 223 and configured to engage with the two arms of the fastening element 223, so that the copper wire 41 of the winding set 40 is clamped and fixed between the two arms of the fastening element 223. It should be emphasized that since the two arms of the fastening element 223 are configured to form two jagged blades in staggered arrangement, when the winding set 40 is fixed on the second side 202 of the heat dissipation module 20 and the copper wire 41 is assembled on the fastening element 223, the copper wire 41 is clamped and the outer insulation layer of copper wire coating over the copper wire 41 is scratched to remove, thereby simplifying the assembly process into a single step. Namely, the copper wire 41 of the winding set 40 can be assembled and electrically connected to the conductive terminal 22 without the process of soldering or scratching the copper wire 41 to remove the insulation layer in advance. Certainly, the present disclosure is not limited thereto and not redundantly describe herein.

Moreover, preferably but not exclusively, in the embodiment, the motor structure 1 includes a first cover 50 and a second cover 60 connected to the motor base 10. The first cover 50 is connected to a first surface 101 of the motor base 10 and covers the circuit board 30 disposed on heat dissipation module 20 located on the central portion 11, so as to protect the electronic components disposed on the circuit board 30 and improve the effects of waterproofing and dustproof. Moreover, in order to improve the effect of heat dissipation, the circuit board 30 is attached to the first side 201 of the heat dissipation module 20 through at least one thermal conductive element 31, for example a thermal adhesive, a thermal pad or a thermal paste. The first cover 50 is fixed on the motor base 10 through for example a screw, but the present disclosure is not limited thereto. In addition, the second cover 60 is connected to the second surface 102 of the motor base 10. The second cover 60 has an opening 61. In the embodiment, an accommodation space 15 is defined among the second surface 102 of the motor base 10 and the second cover 60, and the winding set 40 is at least partially received within the accommodation space 15 and located through the opening 61. The winding set 40 is further combined with a bearing 47 to form a stator 43. In the embodiment, the motor structure 1 is exemplified by an outer rotor 71 and an inner stator 43, but the present disclosure is not limited thereto. Preferably but not exclusively, the motor structure 1 includes a fan blade assembly 80. The fan blade assembly 80 is connected to the rotor 71. The rotating shaft 70 of the rotor 71 is connected to the winding set 40 through the bearing 47, so that the winding set 40 can drive the rotor 71 to rotate. Preferably but not exclusively, in the embodiment, the rotating shaft 70 runs through the central opening 24 disposed on the heat dissipation module 20. In addition, the stator 43 formed by the winding set 40 and the bearing 47 is fixed on the central portion 11 of the motor base 10, and the rotor 71 covers the stator 43, so that the motor structure 1 is configured to form a fan motor, but the present disclosure is not limited thereto. Moreover, preferably but not exclusively, the surrounding portion 12 of the motor base 10 includes a first fastening element 17 and the second cover 60 includes a second fastening element 62. The first fastening element 17 and the second fastening element 62 are matched and engaged with each other, so as to fix the second cover 60 on the surrounding portion 12 of the motor base 10. It should be noted that the fastening method of the second cover 60 and the surrounding portion 12 of the motor base 10 is not an essential feature and the present disclosure is not limited thereto. Since the second cover 60 is fixed on the surrounding portion 12 of the motor base 10 and the winding set 40 at least partially received within the accommodation space 15 is fixed on the central portion 11 of the motor base 10, the winding set 40 runs through the opening 61 instead of contacting with the second cover 60. The vibration generated for example by the rotation of the fan blade assembly 80, the rotor 71 and the rotating shaft 70 passing through the bearing 47 relative to the winding set 40 of the stator 43 can be eliminated due to the deformation of the at least one connecting element 13, so that the surrounding portion 12 of the motor base 10 and the second cover 60 are not influenced thereby. On the other hand, the at least one heat dissipation element 21 of the heat dissipation module 20 is convexly disposed on the second side 202. After the second cover 60 is assembled with the surrounding portion 12 of the motor base 10, the heat dissipation element 21 of the heat dissipation module 20 is located within the accommodation space 15. In the embodiment, the motor base 10 further includes an airflow channel 16 disposed on the surrounding portion 12 and in fluid communication between the exterior of the motor base 10 and the accommodation space 15. Thus, the convection of air flowing between the exterior of the motor base 10 and the accommodation space 15 is enhanced, and the heat dissipation effect of the heat dissipation module 20 is enhanced. Certainly, the present disclosure is not limited thereto.

Figure 7:
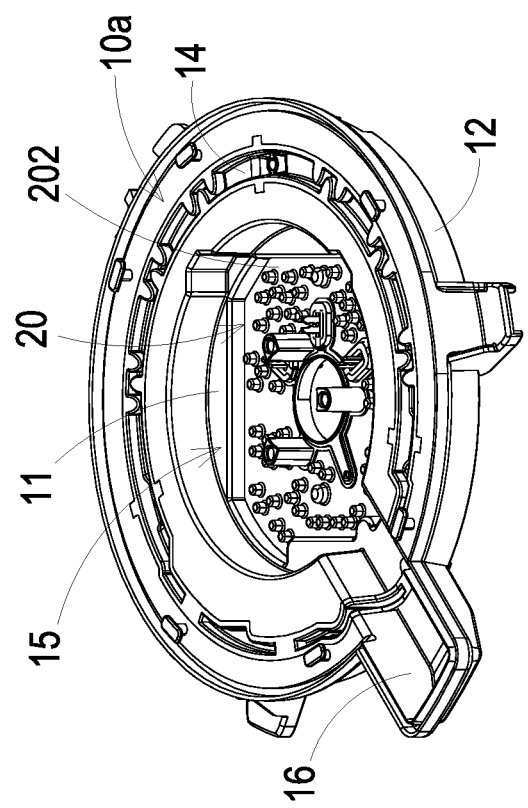
FIG. 7 is a schematic perspective view illustrating a motor base according to a second embodiment of the present disclosure.
Figure 8:
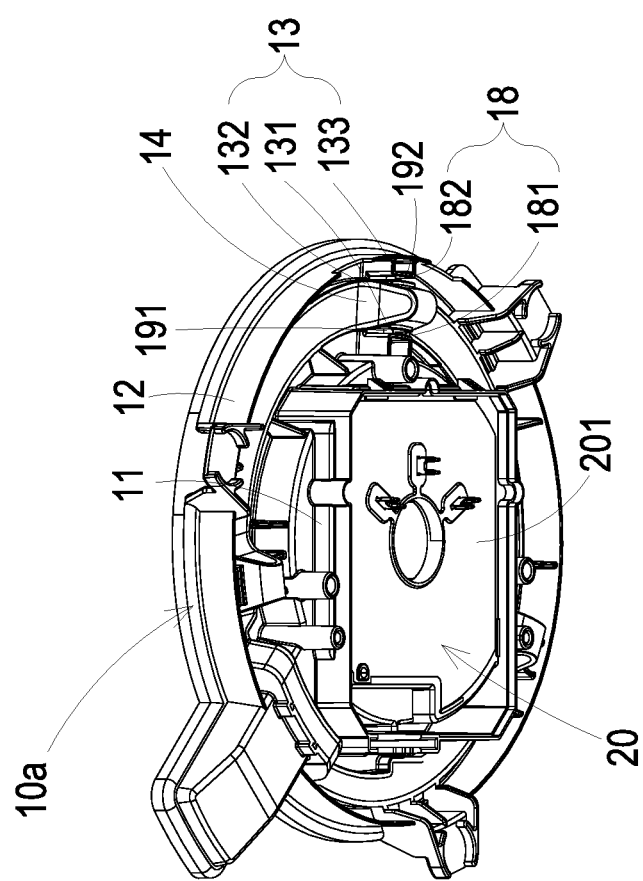
FIG. 8 is another schematic perspective view illustrating the motor base according to the second embodiment of the present disclosure and taken at a different observation angle.
Figure 9:
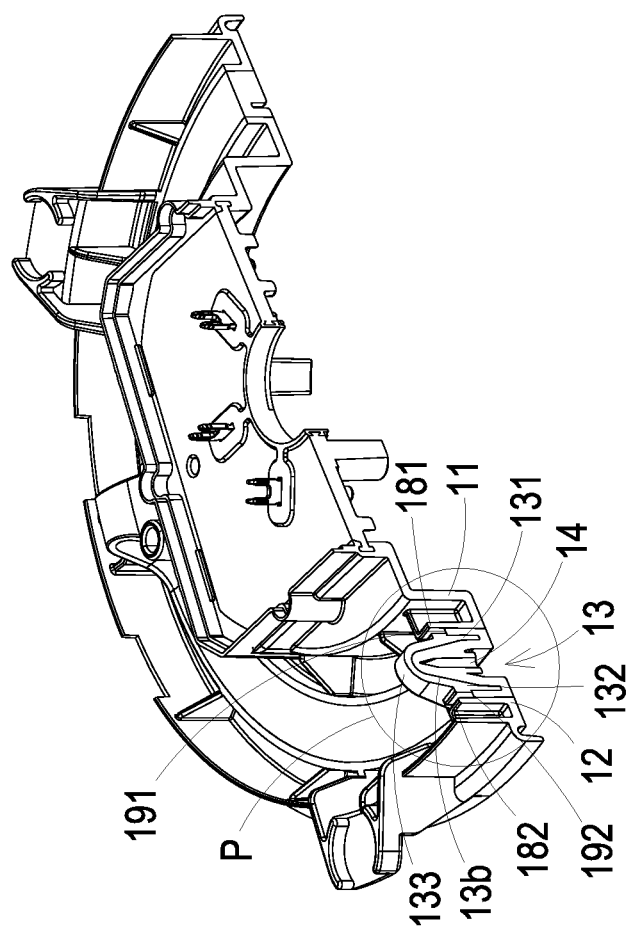
FIG. 9 is a sectional structural view illustrating the motor base according to the second embodiment of the present disclosure.
Figure 10:
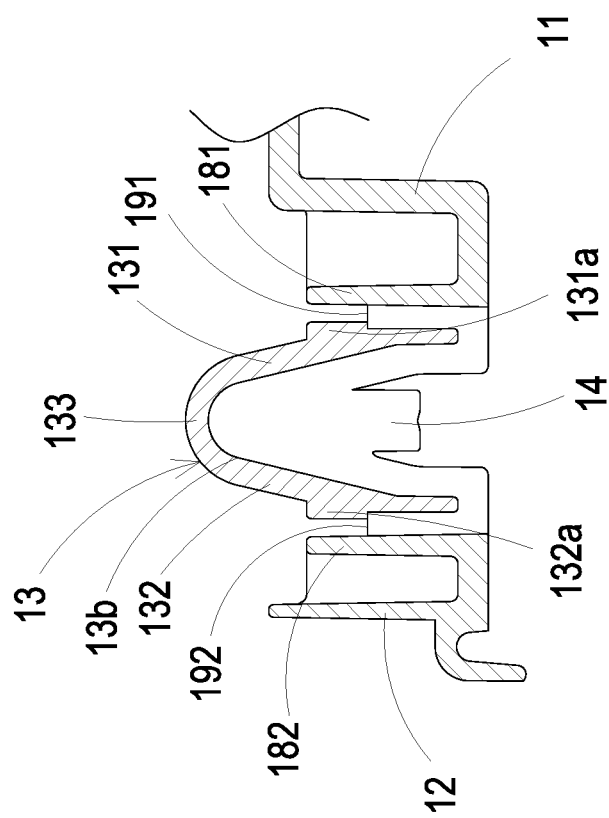
FIG. 10 is a cross sectional view of the zone P in FIG. 9.

FIGS. 7 and 8 are schematic perspective views illustrating a motor base according to a second embodiment of the present disclosure. FIG. 9 is a sectional structural view illustrating the motor base according to the second embodiment of the present disclosure. FIG. 10 is a cross sectional view of the zone P in FIG. 9. In the embodiment, the structures, elements and functions of the motor base 10a are similar to those of the motor base 10 of the motor structure 1 in FIGS. 1 to 6. The elements and features indicated by the numerals similar to those of the first embodiment mean similar elements and features, and are not redundantly described herein. In the embodiment, the motor base 10a includes a central portion 11, a surrounding portion 12, at least one connecting element 13, a buffer component 14, and at least one limitation element 18. The motor base 10a is connected to the heat dissipation module 20 for example through the central portion 11, and uncovers the first side 201 and the second side 202 of the heat dissipation module 20. Preferably but not exclusively, the heat dissipation module 20 and the motor base 10a are further combined with each other by over molding or insert molding so as to integrally form a one-piece structure. In the embodiment, the central portion 11 is configured to dispose the winding set 40 thereon (referred to FIG. 1). The surrounding portion 12 is disposed around the central portion 11. The at least one connecting element 13 is deformable and connected between the central portion 11 and the surrounding portion 12. In the embodiment, the at least one connecting element 13 includes a first supporting part 131, a second supporting part 132 and a deformation part 133. The first supporting part 131 is connected with the central portion 11. Preferably but not exclusively, the hardness of the first supporting part 131 is greater than or equal to that of the central portion 11. The second supporting part 132 is connected with the surrounding portion 12. Preferably but not exclusively, the hardness of the second supporting part 132 is greater than or equal to that of the surrounding portion 12. The deformation part 133 is connected between the first supporting part 131 and the second supporting part 132, so that the connecting element 13 is deformable and connected between the central portion 11 and the surrounding portion 12. By utilizing the connecting element 13 deformable and connected between the central portion 11 and the surrounding portion 12 to provide a buffer function, the supporting strength of the motor base 10a is improved. It further achieves the functions of eliminating the vibration and the noise. On the other hand, the at least one limitation element 18 spatially corresponds to the at last one connecting element 13 and is disposed adjacent to the at least one connecting element 13. Preferably but not exclusively, the at least one limitation element 18 includes a first limitation part 181 and a second limitation part 182. The first limitation part 181 is disposed on the central portion 11 and spaced apart from the first supporting part 131. The second limitation part 182 is disposed on the surrounding portion 12 and spaced apart from the second supporting part 132. By utilizing the at least one limitation element 18, the deformable connecting element 13 connected between the central portion 11 and the surrounding portion 12 of the motor base 10a is limited to vibrate at a specific range. Thus, a violent vibration is avoided, and the effects of eliminating vibration and noise of the motor base 10a and the motor structure 1 are further enhanced.

In the embodiment, the motor base 10a includes for example but not limited to three connecting elements 13, which are annularly distributed and corresponding to each other or equally spaced apart with each other. In the embodiment, the motor base 10a further includes for example but not limited to three limitation elements 18, which spatially corresponds to the three connecting elements 13 and each limitation element 18 is disposed adjacent to the corresponding connecting element 13. In the embodiment, the first supporting part 131, the second supporting part 132 and the deformation part 133 of the connecting element 13 are configured to form a U-shaped, W-shaped or V shaped structure having at least one bending bridge disposed between the first limitation part 181 disposed on the central portion 11 and the second limitation part 182 disposed on the surrounding portion 12, so that the first supporting part 131, the second supporting part 132 and the deformation part 133 are cooperatively form a buffer zone 13b between the first limitation part 181 and the second limitation part 182 (referred to FIG. 9).

Moreover, in the embodiment, the motor base 10a further includes the buffer component 14. The buffer component 14 is for example made of rubber, silicon or foaming material, and is disposed between the first limitation part 181 disposed on the central portion 11 and the second limitation part 182 disposed on the surrounding portion 12. Preferably but not exclusively, the buffer component 14 is filled within the buffer zone 13b cooperatively formed by the first supporting part 131, the second supporting part 132 and the deformation part 133. In the embodiment, the central portion 11, the surrounding portion 12, the at least one connecting element 13 of the motor base 10a, the at least one limitation element 18 and the buffer component 14 are integrally formed into one piece by over molding or insert molding. The central portion 11, the surrounding portion 12, the at least one connecting element 13 and the at least one limitation element 18 are made of the same material, for example but not limited to be made of plastic, and the buffer component 14 is made of rubber, but the present disclosure is not limited thereto. With the arrangement of the buffer component 14, the effects of eliminating the vibration and the noise and the effect of waterproofing of the motor base 10a are further improved.

In the embodiment, a first trench 191 is formed between the first supporting part 131 and the first limitation part 181, and a second trench 192 is formed between the second supporting part 132 and the second limitation part 182. Preferably but not exclusively, the first trench 191 and the second trench 192 are partially filled within the buffer component 14. Notably, the first trench 191, the first supporting part 131, the deformation part 133, the second supporting part 132 and the second trench 192 are cooperatively form the buffer zone 13b between the first limitation part 181 and the second limitation part 182. In response to the vibration generated form the central portion 11, the connecting element 13 is deformed toward the first limitation part 181 or the second limitation part 182. It should be emphasized that the sizes of the first trench 191, the first supporting part 131, the deformation part 133, the second supporting part 132 and the second trench 192 are adjustable and designed according to the practical requirements. Preferably but not exclusively, the first supporting part 131 is symmetrical to the second supporting part 132, the first limitation part 181 is symmetrical to the second limitation part 182, and the first trench 191 is symmetrical to the second trench 192. The present disclosure is not limited thereto, and not redundantly described herein.

Figure 11:
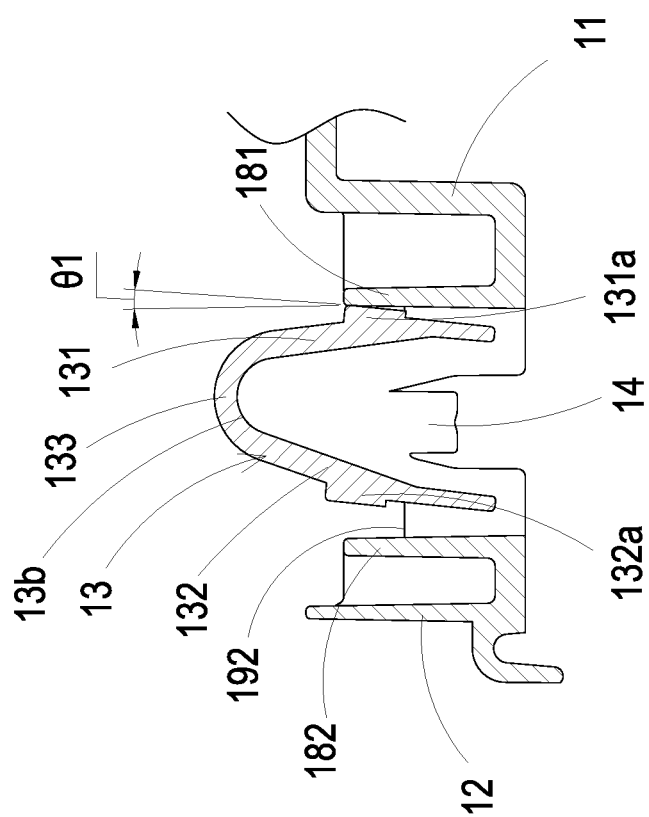
FIG. 11 is an exemplary view illustrating the deformation of the connecting element of the motor base according to the second embodiment of the present disclosure.
Figure 12:
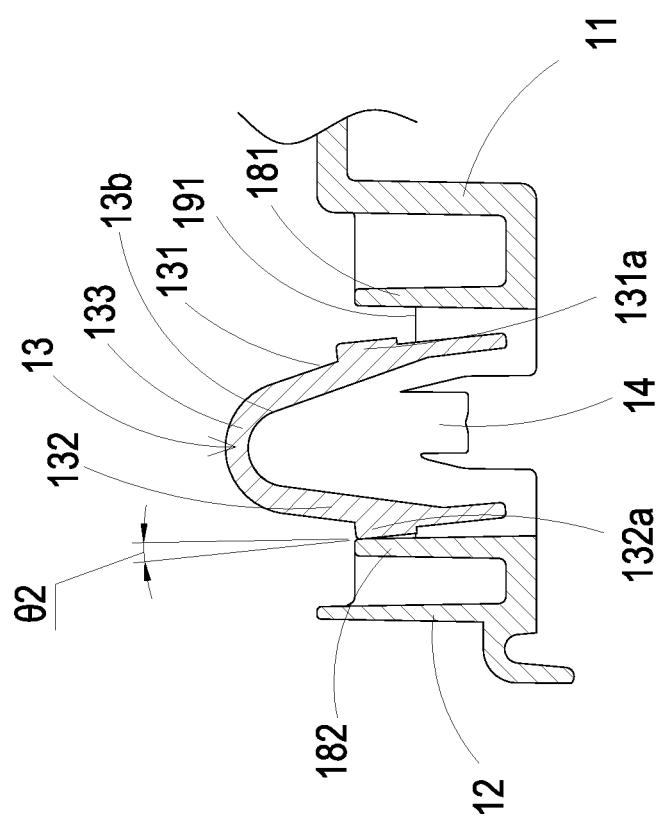
FIG. 12 is another exemplary view illustrating the deformation of the connecting element of the motor base according to the second embodiment of the present disclosure.

FIG. 11 is an exemplary view illustrating the deformation of the connecting element of the motor base according to the second embodiment of the present disclosure. FIG. 12 is another exemplary view illustrating the deformation of the connecting element of the motor base according to the second embodiment of the present disclosure. In the embodiment, the first supporting part 131 further includes a first protrusion 131a facing the first limitation part 181 and spaced apart from the first limitation part 181 through the first trench 191. The first limitation part 181 is utilized to limit the motion of the first protrusion 131a of the first supporting part 131. When the first protrusion 131a abuts against the first limitation part 181 due to the vibration generated form the central portion 11, the first supporting part 131 is limited to tilt at a first angle θ1. Similarly, the second part 132 further includes a second protrusion 132a facing the second limitation part 182 and spaced apart from the second limitation part 182 through the second trench 192. The second limitation part 182 is utilized to limit the motion of the second protrusion 132a of the second supporting part 132. When the second protrusion 132a abuts against the second limitation part 182 due to the vibration generated form the central portion 11, the second supporting part 132 is limited to tilt at a second angle θ2. Preferably but not exclusively, the first angle θ1 is equal to the second angle θ2. Certainly, the first angle θ1 and the second angle θ2 are adjusted by designing the sizes of the first trench 191, the first supporting part 131, the deformation part 133, the second supporting part 132 and the second trench 192. The present disclosure is not limited thereto and not redundantly described herein. Accordingly, by utilizing the at least one limitation element 18, the deformable connecting element 13 connected between the central portion 11 and the surrounding portion 12 of the motor base 10a is limited to vibrate at a specific range. Thus, a violent vibration is avoided, and the effects of eliminating vibration and noise of the motor base 10a and the motor structure 1 are further enhanced.

From the above descriptions, the present disclosure provides a motor base and a motor structure having an integrally formed motor base. Owing to the deformable connecting element, the surrounding portion surrounds the central portion through the deformable connecting element. By utilizing the deformable connecting element connected between the central portion and the surrounding portion to provide buffer function, the strength of the motor base is improved to carry the components such as winding set, and the vibration and the noise of the motor base and motor structure are eliminated. In addition, by utilizing the technique such as over molding or insert molding, the motor base and the buffer component are integrally formed into one piece, so as to simplify the assembly process and eliminate the use of redundant components at the same time. It also achieves the effects of waterproofing, dustproof and protection. Moreover, by combining the motor base and the heat dissipation module, the motor structure having the integrally formed motor base can effectively dissipate the heat for example generated from the heat-generating components on the circuit board, the strength of the motor base is further improved, and the motor structure can achieve high-density construction. On the other hand, by utilizing the at least one limitation element, the deformable connecting element connected between the central portion and the surrounding portion of the motor base is limited to vibrate at a specific range. Thus, a violent vibration is avoided, and the effects of eliminating vibration and noise of the motor base and the motor structure are further enhanced.

While the disclosure has been described in terms of what is presently considered to be the most practical and preferred embodiments, it is to be understood that the disclosure needs not be limited to the disclosed embodiment.

What is claimed is:

1. A motor structure, comprising:
    a winding set;
    a rotor corresponding to and driven by the winding set; and
    a motor base comprising:
        a central portion configured to dispose the winding set thereon;
        a surrounding portion disposed around the central portion; and
        at least one connecting element deformable and connected between the central portion and the surrounding portion, and comprising:
            a first supporting part connected with the central portion, wherein the hardness of the first supporting part is greater than or equal to that of the central portion;
            a second supporting part connected with the surrounding portion, wherein the hardness of the second supporting part is greater than or equal to that of the surrounding portion; and
            a deformation part connected between the first supporting part and the second supporting part; and
    at least one limitation element spatially corresponding to the at last one connecting element and disposed adjacent to the at least one connecting element, wherein the at least one limitation element comprises:
        a first limitation part disposed on the central portion and spaced apart from the first supporting part; and
        a second limitation part disposed on the surrounding portion and spaced apart from the second supporting part.

2. The motor structure according to claim 1, wherein the first supporting part, the second supporting part and the deformation part are cooperatively form a buffer zone between the first limitation part and the second limitation part.

3. The motor structure according to claim 2, further comprising a buffer component, wherein the buffer component is disposed between the central portion and the surrounding portion, and is filled within the buffer zone.

4. The motor structure according to claim 3, wherein a first trench is formed between the first supporting part and the first limitation part, and a second trench is formed between the second supporting part and the second limitation part.

5. The motor structure according to claim 4, wherein the first trench and the second trench are partially filled within the buffer component.

6. The motor structure according to claim 4, wherein the first supporting part is symmetrical to the second supporting part, the first limitation part is symmetrical to the second limitation part, and the first trench is symmetrical to the second trench.

7. The motor structure according to claim 3, wherein the central portion, the surrounding portion, the at least one connecting element, the limitation element and the buffer component are integrally formed into one piece by over molding or insert molding.

8. The motor structure according to claim 3, wherein the central portion, the surrounding portion, the at least one connecting element and the limitation element are made of plastic, and the buffer component is made of rubber.

9. The motor structure according to claim 1, wherein the first supporting part comprises a first protrusion facing the first limitation part to limit the first supporting part tilting at a first angle when the first protrusion abuts against the first limitation part.

10. The motor structure according to claim 1, wherein the second supporting part comprises a second protrusion facing the second limitation part to limit the second supporting part tilting at a second angle when the second protrusion abuts against the second limitation part.

11. A motor base disposed in a motor structure comprising a winding set, the motor base comprising:
    a central portion configured to dispose the winding set thereon;
    a surrounding portion disposed around the central portion; and
    at least one connecting element deformable and connected between the central portion and the surrounding portion, and comprising:
        a first supporting part connected with the central portion, wherein the hardness of the first supporting part is greater than or equal to that of the central portion;

a second supporting part connected with the surrounding portion, wherein the hardness of the second supporting part is greater than or equal to that of the surrounding portion;

a deformation part connected between the first supporting part and the second supporting part; and at least one limitation element spatially corresponding to the at last one connecting element and disposed adjacent to the at least one connecting element, wherein the at least one limitation element comprises:

a first limitation part disposed on the central portion and spaced apart from the first supporting part to form a first trench; and a second limitation part disposed on the surrounding portion and spaced apart from the second supporting part to form a second trench.

12. The motor base according to claim 11, wherein the first supporting part, the second supporting part and the deformation part are cooperatively form a buffer zone between the first limitation part and the second limitation part.

13. The motor base according to claim 12, further comprising a buffer component, wherein the buffer component is disposed between the central portion and the surrounding portion, and is filled within the buffer zone.

14. The motor base according to claim 13, wherein a first trench is formed between the first supporting part and the first limitation part, and a second trench is formed between the second supporting part and the second limitation part.

15. The motor base according to claim 14, wherein the first trench and the second trench are partially filled within the buffer component.

16. The motor base according to claim 13, wherein the central portion, the surrounding portion, the at least one connecting element, the at least one limitation element and the buffer component are integrally formed into one piece by over molding or insert molding.

17. The motor base according to claim 13, wherein the central portion, the surrounding portion, the at least one connecting element and the limitation element are made of plastic, and the buffer component is made of rubber.

18. The motor base according to claim 11, wherein the first supporting part comprises a first protrusion facing the first limitation part to limit the first supporting part tilting at a first angle when the first protrusion abuts against the first limitation part.

19. The motor base according to claim 11, wherein the second supporting part comprises a second protrusion facing the second limitation part to limit the second supporting part tilting at a second angle when the second protrusion abuts against the second limitation part.

20. The motor base according to claim 11, wherein the first supporting part is symmetrical to the second supporting part, the first limitation part is symmetrical to the second limitation part, and the first trench is symmetrical to the second trench.

* * * * *